US012541187B2

(12) United States Patent
Takashima (10) Patent No.: US 12,541,187 B2
(45) Date of Patent: Feb. 3, 2026

(54) PLC DEVICE AND INDUSTRIAL MACHINE SYSTEM

(71) Applicant: FANUC CORPORATION, Yamanashi (JP)

(72) Inventor: Yaoki Takashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 421 days.

(21) Appl. No.: 18/021,651

(22) PCT Filed: Sep. 9, 2021

(86) PCT No.: PCT/JP2021/033142
§ 371 (c)(1),
(2) Date: Feb. 16, 2023

(87) PCT Pub. No.: WO2022/059588
PCT Pub. Date: Mar. 24, 2022

(65) Prior Publication Data
US 2023/0305509 A1 Sep. 28, 2023

(30) Foreign Application Priority Data
Sep. 16, 2020 (JP) .................. 2020-155364

(51) Int. Cl.
*G05B 19/05* (2006.01)
(52) U.S. Cl.
CPC .. *G05B 19/054* (2013.01); *G05B 2219/15038* (2013.01)
(58) Field of Classification Search
CPC ........ G05B 19/054; G05B 2219/15038; G05B 19/05; G05B 19/056; G06F 16/3329; G06F 16/951; G06F 16/40; G10L 15/26
See application file for complete search history.

(56) References Cited

U.S. PATENT DOCUMENTS 8,918,803 B2 * 12/2014 Bangalore ........ H04N 21/47815
725/18
2002/0046221 A1 * 4/2002 Louis Wallace ...... G06F 16/958
707/E17.116
(Continued)

FOREIGN PATENT DOCUMENTS

CN 1291853 4/2001
CN 104246729 12/2014
(Continued)

OTHER PUBLICATIONS

Hadžiosmanović, D., Sommer, R., Zambon, E. and Hartel, P.H., Dec. 2014. Through the eye of the PLC: semantic security monitoring for industrial processes. In Proceedings of the 30th Annual Computer Security Applications Conference (pp. 126-135). (Year: 2014).*

(Continued)

*Primary Examiner* — Alicia M. Choi
(74) *Attorney, Agent, or Firm* — Wenderoth, Lind & Ponack, L.L.P.

(57) ABSTRACT

In order to output a given text string from a ladder program that has been analyzed, this PLC device is provided with a text data output unit for reading text data from a storage device, a display unit for outputting the given prescribed text string to a display device, and a communication unit for carrying out text communication with a network server by means of a prescribed command. In addition, the text data output unit is able to implement general-purpose protocol communication (HTTP communication) with a PLC program by determining, on the basis of a keyword included in the text data, whether the text data is to be output to the display unit or the communication unit, and outputting the text data to the display unit or the communication unit, on the basis of the determination result.

5 Claims, 10 Drawing Sheets

(56) References Cited

U.S. PATENT DOCUMENTS

| | | | |
|---|---|---|---|
| 2006/0179120 A1* | 8/2006 | Kegoya | G05B 19/05 709/217 |
| 2006/0224661 A1* | 10/2006 | Aono | G05B 19/0423 709/201 |
| 2014/0228984 A1 | 8/2014 | Nakaminami | |
| 2015/0130688 A1 | 5/2015 | Li et al. | |
| 2017/0083017 A1* | 3/2017 | Ino | G05B 19/406 |
| 2018/0231947 A1* | 8/2018 | Matsumoto | G05B 19/0426 |
| 2023/0076530 A1* | 3/2023 | Håkansson | G06Q 10/0631 |

FOREIGN PATENT DOCUMENTS

| | | |
|---|---|---|
| CN | 105027012 | 11/2015 |
| JP | 04-164552 | 6/1992 |
| JP | 2002-297206 | 10/2002 |
| JP | 2004-213406 | 7/2004 |
| JP | 2004-302880 | 10/2004 |
| JP | 2004302880 A * | 10/2004 |
| JP | 2005-174306 | 6/2005 |
| JP | 2005-251014 | 9/2005 |
| JP | 2008-282363 | 11/2008 |
| JP | 2016-110459 | 6/2016 |
| JP | 2018-139162 | 9/2018 |
| WO | 2013/018219 | 2/2013 |

OTHER PUBLICATIONS

International Search Report issued Dec. 7, 2021, in International (PCT) Application No. PCT/JP2021/033142, with English translation.

* cited by examiner

ALARM XXX ERROR

FIG. 3B

$curl -X POST --data-urlencode 'senddata'
*https://hooks.slack.com/services/[TOKEN]*

FIG. 3C

[HTTP_POST `senddeta` http://pmc.fanuc.co.jp/alarm_post]

FIG. 3D

```
$curl --url "smtps://smtp.gmail.com:465" --ssl-reqd
  --mail-from "tanaka@fanuc.com" --mail-rcpt "your-account@gmail.com"
  --upload-file "pmc_mail.txt" --user "your-account@gmail.com:your-password" --insecure -v
```

FIG. 3E

```
$telnet
set localecho
OPEN mail.fanuc.co.jp 25
EHLO pmc.fanuc.co.jp
MAIL FROM: <system@pmc.fanuc.co.jp>
RCPT TO: <stuffall@pmc.fanuc.co.jp> NOTIFY=success,failure
DATA
Subject: Error Notice XXX System Error Occurred.
QUIT
```

FIG. 3F

```
[SMTP_SEND subject="Error Notice" data=" XXX System Error Occurred."]
```

FIG. 3G

```
$curl -X GET -o disp http://www.fan11105plc.com/update/notice.json
```

FIG. 3H

```
$curl -X GET -o "X:/replydata" http://www.fan11105plc.com/notice.xml
```

```
$curl -o '/SDDRV/plc_update_check.json'
https://sample_mtb/PLC1/update_plc
```

FIG. 7C

```
{
  "system":"PLC1"
  "date": "2020/7/29",
  "version": 1.01
}
```

PLC DEVICE AND INDUSTRIAL MACHINE SYSTEM

TECHNICAL FIELD

The present invention relates to a PLC device and an industrial machine system.

BACKGROUND ART

An industrial machine uses a programmable logic controller (PLC) to perform sequence control using programs, such as ladder programs, for the control of devices. For example, when the industrial machine detects an abnormality, message data is displayed by the sequence control on a display device placed outside the industrial machine to notify a user of the industrial machine that the abnormality was detected (see, e.g., Patent Document 1).

Patent Document 1: Japanese Unexamined Patent Application, Publication No. H04-164552

DISCLOSURE OF THE INVENTION

Problems to be Solved by the Invention

When the message data is displayed on the display device, it is difficult to check the message data from a remote place. In this case, a network communication function of sequence control programs of the PLC can be used. However, the network communication function requires a dedicated protocol design and dedicated hardware such as a network server and a gateway. An advanced network protocol design technique is indispensable for achieving the dedicated protocol design. Further, the dedicated hardware increases initial and operating costs.

Under these circumstances, there has been required a technique that lowers the initial and operating costs without need of any dedicated hardware, and achieves communication using a general-purpose protocol (e.g., HTTP and SMTP) with a simple PLC program, thereby allowing a user to check a situation from a remote place.

Means for Solving the Problems (1) In an aspect of the present disclosure, a programmable logic controller (PLC) device includes: a text data output unit that reads text data from a storage device to output any given character string from an analyzed ladder program; a display unit that outputs a predetermined character string to a display device; and a communication unit that performs text communication with a network server by a predetermined command. The text data output unit determines whether to output the text data to the display unit or the communication unit based on a keyword included in the text data, and outputs the text data to the display unit or the communication unit based on the result of the determination.

(2) In an aspect of the present disclosure, an industrial machine system includes: an industrial machine equipped with the PLC device of aspect (1); and an HTTP server. The PLC device outputs the text data to the HTTP server when the industrial machine gives an alarm.

Effects of the Invention

According to the aspects, the initial and operating costs are lowered without need of any dedicated hardware, and communication using a general-purpose protocol (e.g., HTTP and SMTP) is achieved with a simple PLC program, thereby allowing a user to check a situation from a remote place.

PREFERRED MODE FOR CARRYING OUT THE INVENTION

An embodiment of the present invention will be described below with reference to FIGS. 1 to 7C.

1. Configuration of Embodiment

Figure 1:
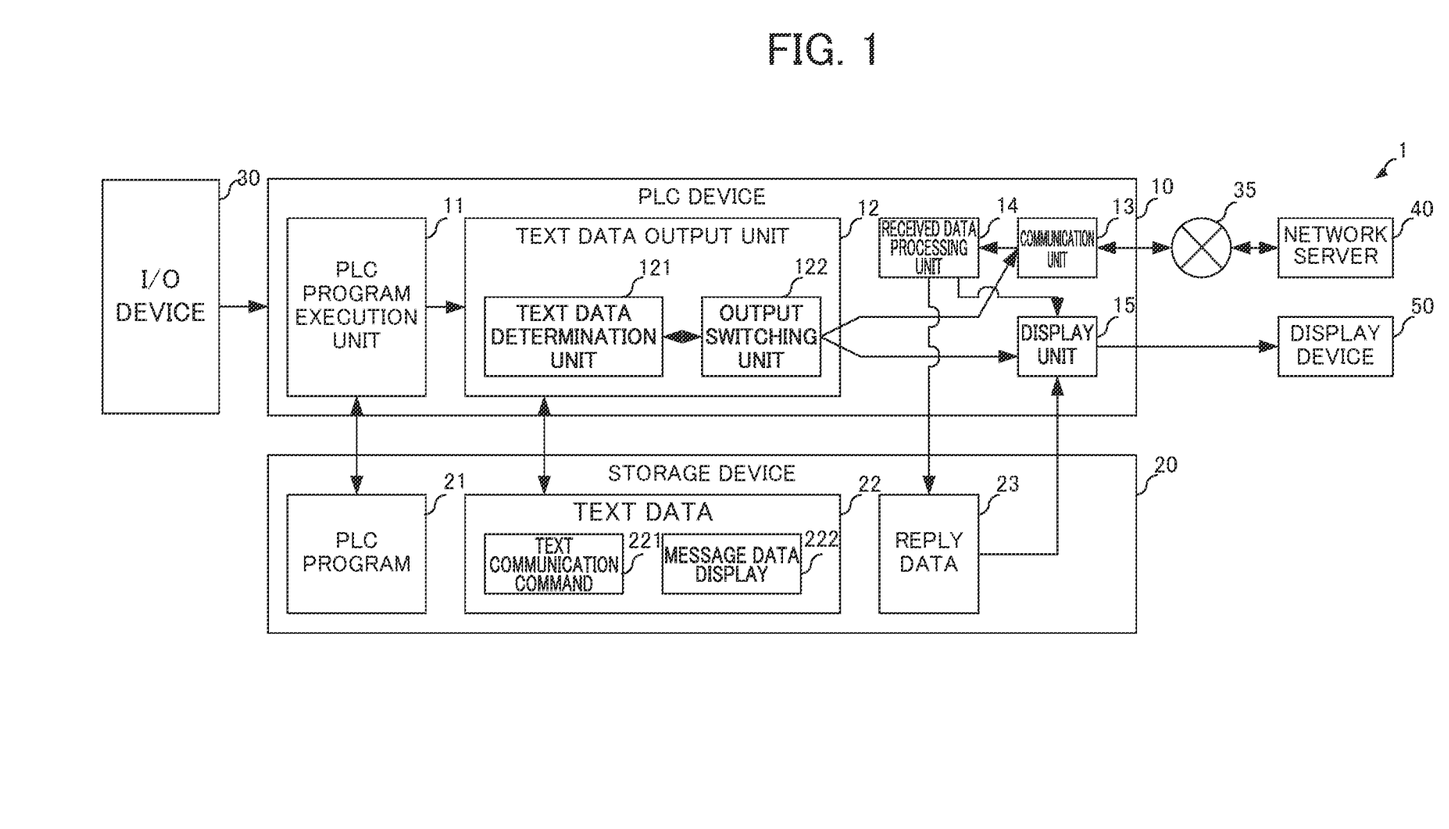
FIG. 1 is a diagram illustrating a PLC device 10 according to an embodiment and a PLC system 1 including the PLC device 10.

FIG. 1 is a diagram illustrating a PLC device 10 according to an embodiment of the present invention and a PLC system 1 including the PLC device 10. The PLC system 1 includes the PLC device 10, a storage device 20, an input/output (I/O) device 30, a network 35, a network server 40, and a display device 50. Prior to the description of the PLC device 10, the storage device 20, the I/O device 30, the network 35, the network server 40, and the display device 50 will be described first.

The storage device 20 stores various types of information, particularly a PLC program 21, text data 22, and reply data 23, in the present embodiment. The storage device 20 may be a rewritable memory such as a hard disc drive (HDD) and a solid-state drive (SSD).

The I/O device 30 produces an output signal to the PLC device 10 (a signal inputted to the PLC device 10) and receives an input signal from the PLC device 10 (a signal outputted from the PLC device 10).

The network server 40 is a server on the network 35, and is connected to the PLC device 10 via the network 35 to be able to communicate with the PLC device 10. In the present embodiment, in particular, the network server 40 achieves protocol communication including the text data 22 with the PLC device 10. The network server 40 may be, for example, an HTTP server or an SMTP server, but is not limited to these examples.

The display device 50 is, for example, a device for displaying an image, such as a display. In the present embodiment, in particular, the display device 50 displays the text data 22 which is message data acquired from the PLC device 10.

The PLC device 10 will be described below. The PLC device 10 executes a sequence control program, such as a ladder program, to perform various control, arithmetic operation, and input and output of signals. The general functions of the PLC device are known and are not described in detail below. Functions according to the present invention will be described in detail in the present embodiment.

As shown in FIG. 1, the PLC device 10 includes a PLC program execution unit 11, a text data output unit 12, a communication unit 13, a received data processing unit 14, and a display unit 15.

The PLC program execution unit 11 reads the PLC program 21 stored in the storage device 20 from the storage device 20, analyzes and executes the PLC program 21, and controls the I/O signal. In the present embodiment, in particular, the PLC program execution unit 11 analyzes a ladder program which is the PLC program 21 that instructs the output of the text data.

As will be described later, the text data output unit 12 reads the text data 22 from the storage device 20 to output any given character string stored in a specified area based on the analyzed ladder program. The text data 22 includes any one of a text communication command 221 or a message data display command 222. The text communication command 221 is a text communication command (e.g., a command related to HTTP communication and a command related to SMTP communication) processed by the communication unit 13 which will be described later. The message data display command 222 is a command that is processed by the display unit 15 which will be described later, and instructs the display device which will be described later to display message data included in the text data 22.

Specifically, the text data output unit 12 includes a text data determination unit 121 and an output switching unit 122.

The text data determination unit 121 determines whether the text data 22 includes the text communication command 221. Specifically, the text data determination unit 121 determines that the text data 22 includes the text communication command 221 when the text data 22 includes a predetermined keyword which is previously set. The text data determination unit 121 determines that the text data 22 includes the message data display command 222 when the text data 22 includes no predetermined keyword which is previously set.

Based on the result of the determination by the text data determination unit 121 indicating that the text data 22 includes the text communication command 221, the output switching unit 122 outputs the text data 22 to the communication unit 13. Otherwise, the output switching unit 122 outputs the text data 22 to the display unit 15. Thus, the output switching unit 122 switches the destination of the given character string included in the PLC program 21 between the display unit 15 and the communication unit 13.

Figure 2A:
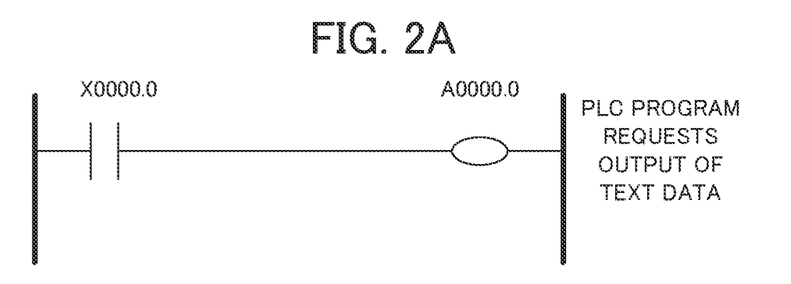
FIG. 2A is a view illustrating an example of a ladder program according to the embodiment.

FIG. 2A shows an example of a ladder program that the PLC program execution unit 11 analyzes so that the text data output unit 12 instructs the output of the text data.

As shown in this example, the text data output unit 12 reads the text data 22 stored in "A0000.0" when, for example, an abnormal signal is outputted by an abnormality detector to turn "X0001.0" ON.

The text data output unit 12 determines, for example, whether the text data 22 stored in "A0000.0" includes the text communication command 221 (e.g., a predetermined keyword previously set). When the text data 22 includes a keyword that requests, for example, HTTP communication, the text data output unit 12 outputs the text data 22 to the communication unit 13. Thus, for example, the communication unit 13 can perform HTTP communication with the HTTP server based on the text data 22. When the text data 22 stored in "A0000.0" include no text communication command 221 (e.g., a predetermined keyword previously set), the text data output unit 12 outputs the text data 22 to the display unit 15 as usual. Thus, for example, the display unit 15 can output a message to the display device based on the text data 22.

Figure 2B:
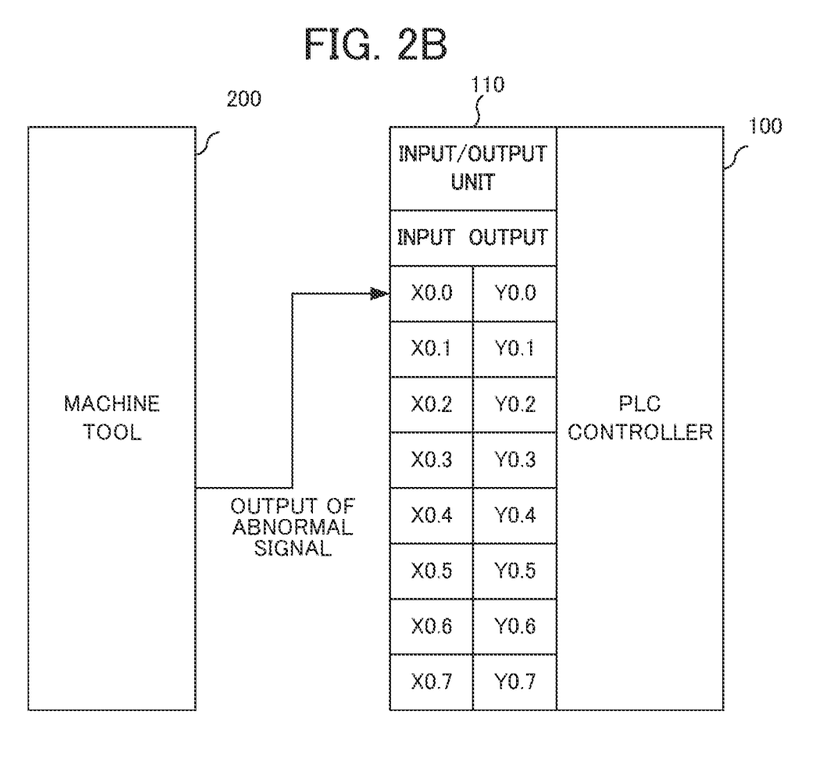
FIG. 2B is a view illustrating an example of an abnormal signal output system according to the embodiment.

FIG. 2B shows an example of an abnormal signal output system in which a machine tool 200 outputs an abnormal signal to an input/output unit 110 of a PLC device 100. FIG. 2A shows an example of a ladder program implemented to output a message when, for example, the abnormal signal is outputted from the machine tool 200 to an input port of the input/output unit 110 as shown in FIG. 2B to turn the abnormal signal of the machine tool 200 "ON".

The processing by the text data output unit 12 will be described next together with some examples of the text data 22.

FIGS. 3A to 3H are views illustrating examples of the text data 22.

Figure 3A:
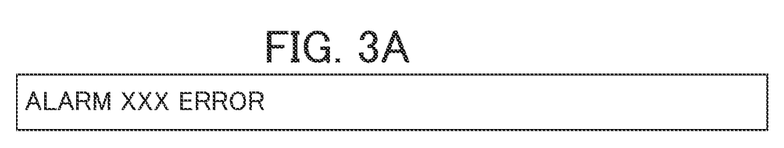
FIG. 3A is a view illustrating an example of text data according to the embodiment.

As shown in FIG. 3A, when the text data 22 stored in "A0000.0" does not include the text communication command 221, i.e., the text data 22 is normal message data, the text data determination unit 121 determines that the text data 22 includes no text communication command, and the output switching unit 122 switches the destination of the text data 22 to the display unit 15. Then, the text data 22 as the normal message data is shown on the display device 50 which will be described later.

Figure 3B:
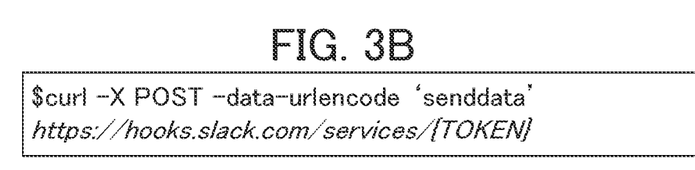
FIG. 3B is a view illustrating an example of the text data according to the embodiment.

As shown in FIG. 3B, when the text data 22 stored in "A0000.0" includes the text communication command 221 ("$curl" in the example of FIG. 3B), the text data determination unit 121 determines that the text data 22 includes the text communication command 221, and the output switching unit 122 switches the destination of the text data 22 to the communication unit 13. Then, an HTTP request is transmitted to the network server 40 which will be described later.

In the example of FIG. 3B, "$curl" is used as the text communication command 221. However, the embodiment of the present invention is not limited to this example. For example, an original command simplified as shown in FIG. 3C may be used as the keyword.

Figure 3C:
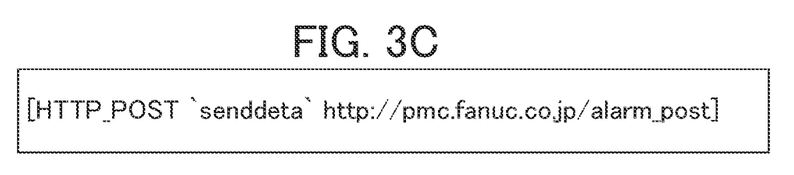
FIG. 3C is a view illustrating an example of the text data according to the embodiment.
Figure 3D:
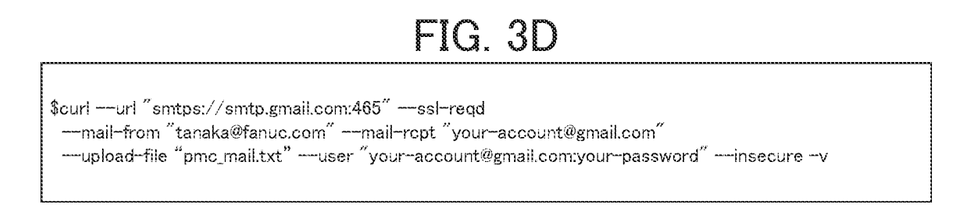
FIG. 3D is a view illustrating an example of the text data according to the embodiment.
Figure 3E:
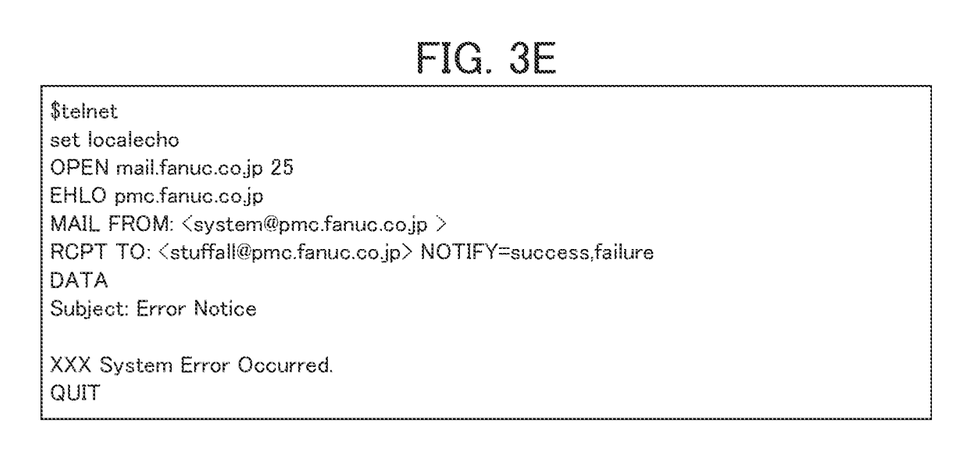
FIG. 3E is a view illustrating an example of the text data according to the embodiment.
Figure 3F:
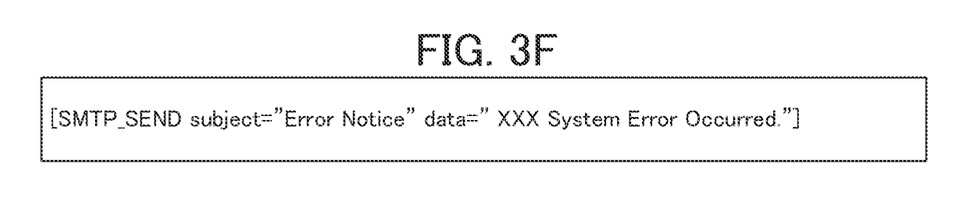
FIG. 3F is a view illustrating an example of the text data according to the embodiment.

In the examples of FIGS. 3B and 3C, a command to transmit the HTTP request is used as the text communication command 221. However, the embodiment of the present invention is not limited to this example. For example, the function of email communication (SMTP) may be executed. As another example, a Gmail (registered trademark) may be sent in a curl command format based on the text data 22 shown in FIG. 3D. As still another example, a mail may be sent to the mail server in a telnet command format based on the text data 22 shown in FIG. 3E. As yet another example, an original command simplified as shown in FIG. 3F may be used to execute the function of email communication. In these examples, information such as a mail address may be written in advance in a configuration file.

The text messages shown in FIGS. 3G and 3H will be described later.

The communication unit 13 performs protocol communication with the network server 40 to exchange the text data. Specifically, the communication unit 13 transmits the text data acquired from the output switching unit 122 to the network server 40 via the network 35, and receives reply data as a response from the network server 40 via the network 35. The communication unit 13 also outputs the received reply data to the received data processing unit 14 which will be described later.

The received data processing unit 14 processes the reply data which is received data acquired from the communication unit 13. Specifically, the received data processing unit 14 distinguishes an option keyword included in the text data from which the received reply data is derived, thereby determining whether to store the reply data in the storage device 20 or display the reply data on the display device 50.

How the received data processing unit 14 processes the data will be described with reference to the text messages shown in FIGS. 3G and 3H. FIGS. 3G and 3H are views illustrating examples of the text data 22 each including an option keyword.

Figure 3G:
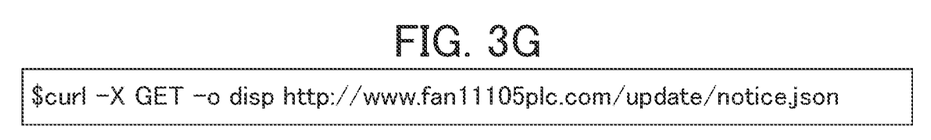
FIG. 3G is a view illustrating an example of the text data according to the embodiment.

The text data 22 shown in FIG. 3G includes a character string "-o disp" as the option keyword that follows "$curl-X GET" which is the text communication command 221. In this case, the received data processing unit 14 acquires the reply data from a URL "http://www.fan11105plc.com/update/notice.json", and outputs the acquired reply data as a message to the display device 50 via the display unit 15.

Figure 3H:
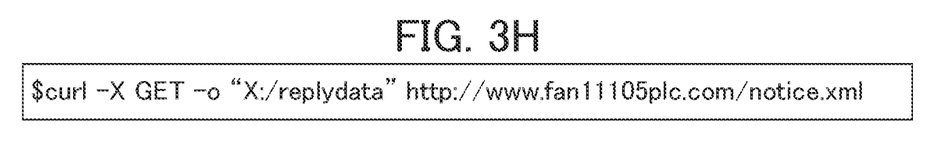
FIG. 3H is a view illustrating an example of the text data according to the embodiment.

On the other hand, the text data 22 shown in FIG. 3H includes "-o" with a filename as the option keyword that follows "$curl-X GET" which is the text communication command 221. In this case, the received data processing unit 14 acquires the reply data from a URL "http://www.fan11105plc.com/notice.xml", and stores the acquired reply data in the storage device 20.

When the received data processing unit 14 stores the reply data in the display device 20, the display unit 15 may display the reply data stored in the storage device 20 on the display device 50. The functional units of the PLC device 10 according to the present invention have been described.

2. Operation According to Embodiment

Figure 4A:
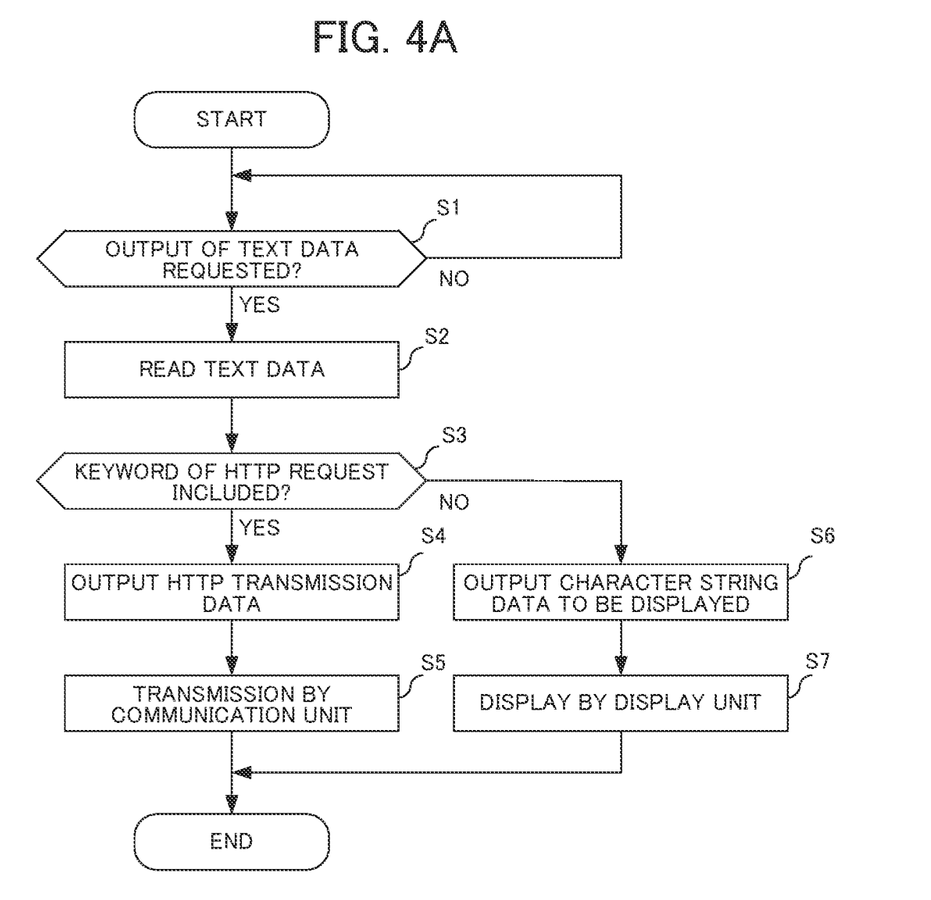
FIG. 4A is a flowchart illustrating an operation of the PLC device according to the embodiment.
Figure 4B:
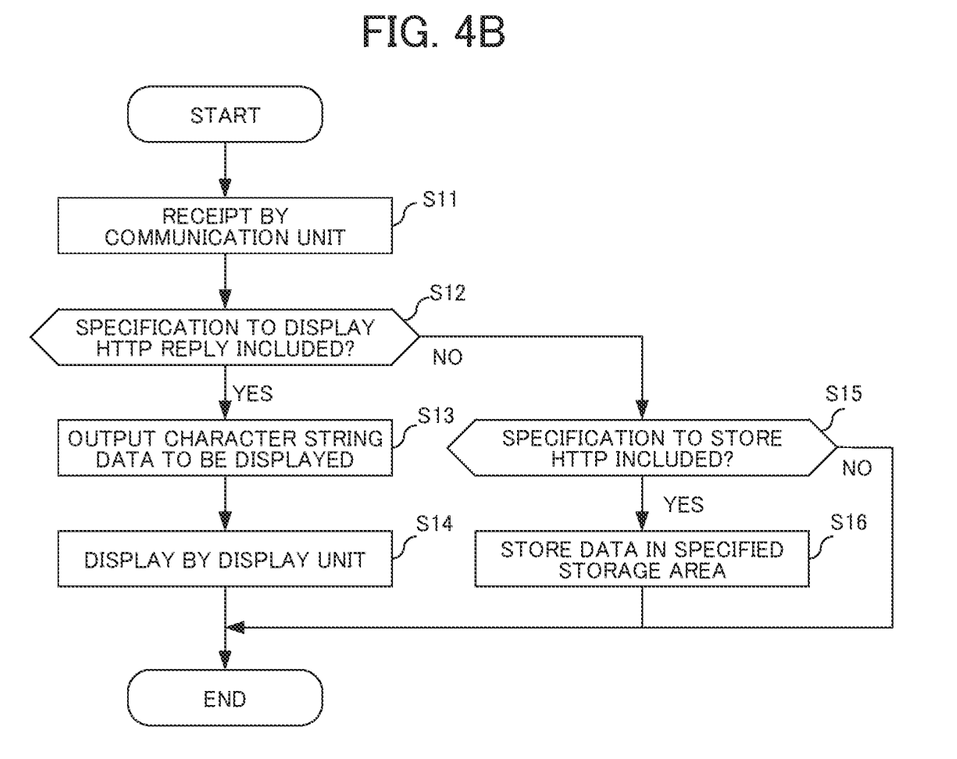
FIG. 4B is a flowchart illustrating an operation of the PLC device according to the embodiment.

FIGS. 4A and 4B are flowcharts illustrating an operation of the PLC device 10 according to the present embodiment. Specifically, FIG. 4A is a flowchart illustrating how the PLC device 10 outputs the text data 22. In this example, an HTTP command is used as the text communication command. However, the present invention is not limited to this example. The HTTP command may be substituted with any text communication command. FIG. 4B is a flowchart illustrating how the PLC device 10 receives HTTP data as the reply data.

2.1 Output of Text Data

When the output of the text data is requested in Step S1 of FIG. 4A (Yes is selected in S1) while the PLC program execution unit 11 is analyzing and executing a ladder program which is the PLC program 21, the process proceeds to Step S2. When the output of the text data is not requested (No is selected in S1), the process returns to Step S1.

In Step S2, the text data output unit 12 reads the text data from the storage device 20.

When the text data includes any keyword of an HTTP request (e.g., "curl" shown in FIG. 3B) as the text communication command 221 in Step S3 (Yes is selected in S3), the process proceeds to Step S4. When the text data includes no keyword of the HTTP request (No is selected in S3), the process proceeds to Step S6.

In Step S4, the text data output unit 12 outputs HTTP transmission data to the communication unit 13.

In Step S5, the communication unit 13 transmits the HTTP transmission data acquired from the text data output unit 12 to the network server 40 via the network 35.

In Step S6, the text data output unit 12 outputs a character string data to be displayed as message data to the display unit 15.

In Step S7, the display unit 15 performs processing to allow the display device 50 to display the character string data to be displayed as the message data.

2.2 Receipt of HTTP Data

In Step S11 of FIG. 4B, the communication unit 13 performs processing to receive the reply data from the network server 40 via the network 35.

When the text data includes a specification to display an HTTP reply (e.g., "-o disp" shown in FIG. 3G) (Yes is selected in S12), the process proceeds to Step S13. When no specification to display the HTTP replay is included (No is selected in S12), the process proceeds to Step S15.

In Step S13, the received data processing unit 14 outputs character string data to be displayed as message data included in the reply data to the display unit 15.

In Step S14, the display unit 15 performs processing to display the character string data to be displayed as the message data on the display device 50.

When the text data includes a specification to store an HTTP (e.g., "-o any filename" shown in FIG. 3H) (Yes is selected in S15), the process proceeds to Step S16. When the text data includes no specification to store the HTTP (No is selected in S15), the process ends.

In Step S16, the received data processing unit 14 stores the reply data 23 in a specified storage area in the storage device 20. The operation of the PLC device 10 according to the present embodiment has been described. In an example described below, a useful system can be easily established by linking the text communication command of the PLC device 10 is to, for example, a server that provides prescribed services in the cloud.

3. Examples

3.1. First Example

Figure 5:
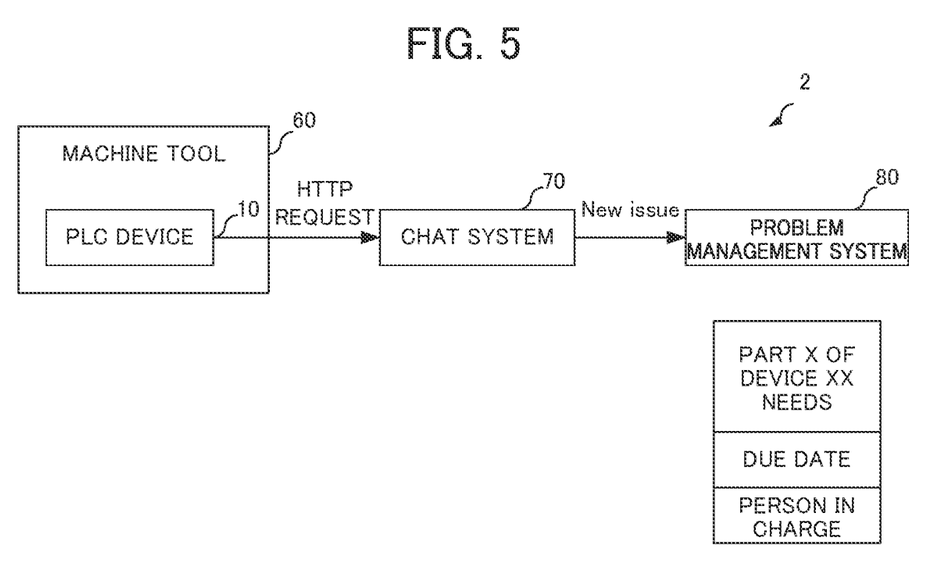
FIG. 5 is a diagram illustrating an industrial machine system according to the embodiment.

A chat system 70 and a problem management system 80 will be described first as a server that provides prescribed services in the cloud. FIG. 5 is a diagram illustrating an industrial machine system 2 as a first example. The industrial machine system 2 includes a machine tool 60 as an industrial machine, an online chat system 70, and a problem management system 80.

The machine tool 60 is, for example, a numerically controlled machining tool and a robot that works in a factory. The machine tool 60 includes the PLC device 10. In this example, in particular, the machine tool 60 gives an alarm when, for example, expendable parts need replacement. In response to the alarm given by the machine tool 60, the PLC device 10 outputs an HTTP request to an online HTTP server in which the chat system 70 is installed.

The chat system 70 is installed in the online HTTP server, and may be, for example, a chatbot such as Slack (registered trademark). When the chat system 70 acquires the HTTP request from the PLC device 10, the chat system 70 transmits a new issue that describes a problem, for example, the expendable parts need replacement, to the problem management system 80.

The problem management system 80 is a system that manages problems that arise among a plurality of industrial machines including the machine tool 60, and may be, for example, a system such as GitHub (registered trademark). When receiving a new issue that describes the problem from the chat system 70, the problem management system 80 registers the new issue by setting a due date for solving the problem and a person in charge of the problem. The person in charge is notified that the new issue is registered. The person in charge remote from the machine tool 60 checks the situation based on the new issue, and solves the problem. In this example, the person in charge in a remote place recognizes that the expendable parts need replacement based on the new issue, and the person in charge or a manager of the machine tool 60 contacted by the person in charge replaces the expendable parts.

The new issue may be registered on a Web page, or may be created by an HTTP POST from outside.

Specifically, when the machine tool 60 of the industrial machine system 2 gives the alarm, a new issue is registered in the problem management system 80 via the chat system 70. This can inform the person in charge of the problem or the manager of the machine tool 60 remote from the machine tool 60 that the alarm was given and the content of the alarm.

In the industrial machine system 2, when the format of the transmission data as the HTTP request and the program of the chat system 70 that received the data are provided as a package, the manager and users of the machine tool 60 can be ready for IoT.

The online HTTP server in which the chat system 70 is installed may be, for example, a server in a facility of the builder of the machine tool 60 or a server in a factory where the machine tool 60 is placed (field server).

3.2. Second Example

Figure 6:
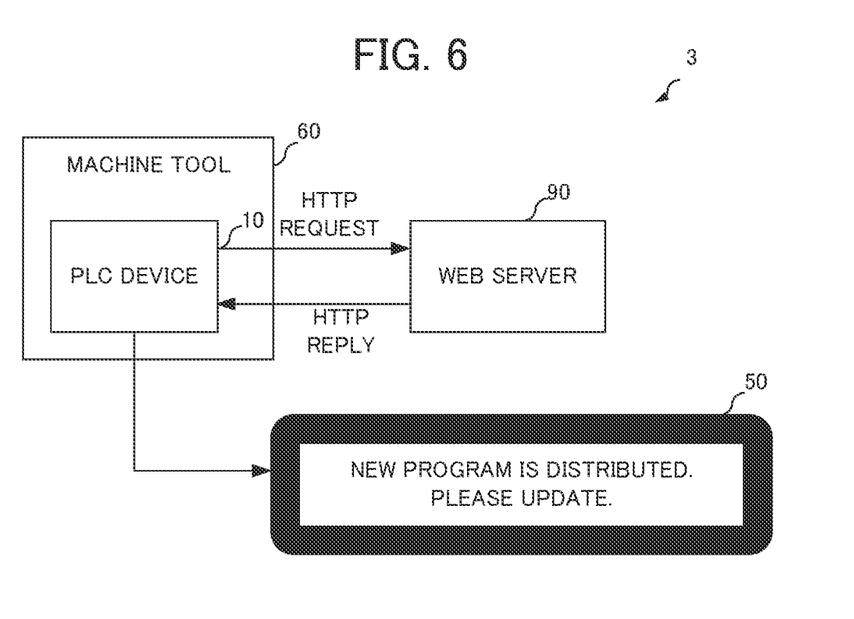
FIG. 6 is a diagram illustrating an industrial machine system according to the embodiment.

In this example, a Web server 90 will be described as a server that provides prescribed services in the cloud. FIG. 6 is a diagram illustrating an industrial machine system 3 as a second example. The industrial machine system 3 includes a machine tool 60 as an industrial machine, a display device 50, and a Web server 90.

The machine tool 60 is, for example, a numerically controlled machining tool and a robot that works in a factory. The machine tool 60 includes the PLC device 10. In this example, in particular, the ladder program that the PLC device 10 executes is implemented to regularly check whether update data of the ladder program is distributed based on the reply data from the Web server 90. In this checking, the PLC device 10 transmits a text data 22 including a text communication command 221 as an HTTP request for checking the distribution of the update data to the Web server 90.

Figure 7A:
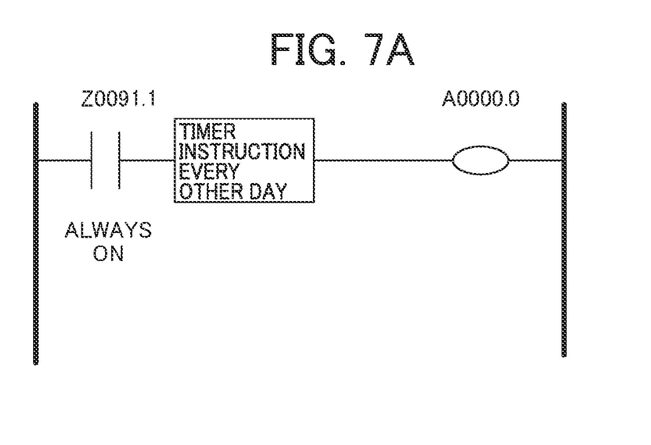
FIG. 7A is a view illustrating an example of a ladder program according to the embodiment.

FIG. 7A is a view illustrating the ladder program that the PLC device 10 executes. For example, a program that runs to output the text data every other day as shown in FIG. 7A is implemented so that the builder of the machine tool 60 can replace the ladder program if improvements or bug fixes are required after the machine tool 60 is shipped.

Figure 7B:
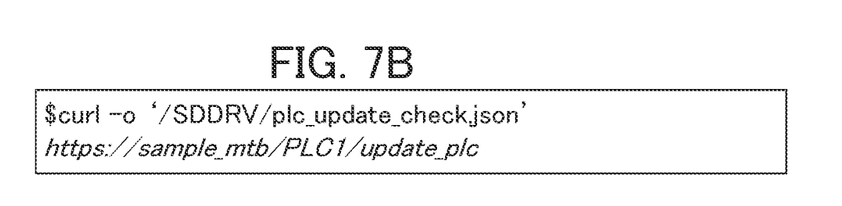
FIG. 7B is a view illustrating an example of the text data according to the embodiment.

FIG. 7B shows an example of the text data. The text data shown in FIG. 7B includes a text communication command that instructs the device to store response data when access to a site "update_plc" of PLC1 is made on a homepage of the builder of the machine tool in the format of plc_update_check.json.

As described above, a URL to a service site of the machine tool is registered in the text data in advance, and the contents of the reply data distributed from the Web server 90 are changed when update is necessary.

Figure 7C:
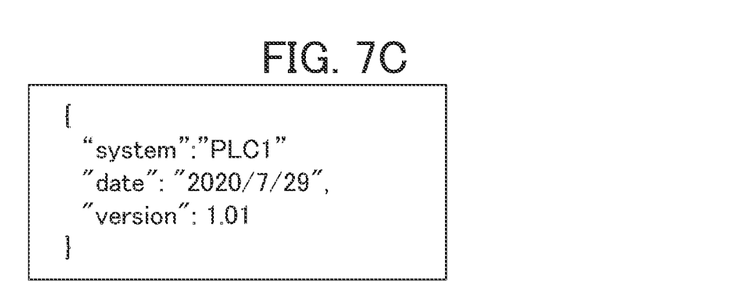
FIG. 7C is a view illustrating an example of a response data format according to the embodiment.

FIG. 7C shows the format of plc_update_check.json.

When a version of the ladder program that the PLC device 10 executes is compared to the latest version included in plc_update_check.json, whether update data is distributed from the Web server 90 can be checked. Thus, if necessary, a notification message can be shown on the display device 50 as shown in FIG. 6.

4. Advantages of Embodiment (1) A programmable logic controller (PLC) device of the present embodiment (e.g., the "PLC device 10") includes: a text data output unit (e.g., the text data output unit 12") that reads text data from a storage device (e.g., the "storage device 20") to output any given character string from an analyzed ladder program; a display unit (e.g., the "display unit 15") that outputs a predetermined character string to a display device (e.g., the "display device 50"); and a communication unit (e.g., the "communication unit 13") that performs text communication with a network server (e.g., the "network server 40") by a predetermined command. The text data output unit (e.g., the "text data output unit 12") determines whether to output the text data to the display unit (e.g., the "display unit 15") or the communication unit (e.g., the "communication unit 13") based on a keyword included in the text data, and outputs the text data to the display unit (e.g., the "display unit 15") or the communication unit (e.g., the "communication unit 13") based on the result of the determination.

This configuration lowers the initial and operating costs without need of any dedicated hardware, and achieves communication using a general-purpose protocol (e.g., HTTP and SMTP) with a simple PLC program, thereby allowing a user to check a situation from a remote place.

Above all, the PLC device can achieve the function of text data communication (HTTP communication and email communication (SMTP)) by detecting a keyword in command data without adding a dedicated command code for implementing the network communication function to a PLC programming tool.

The PLC device requires no advanced network protocol technology, reducing the learning cost of users.

Further, the PLC device uses a general-purpose protocol, and thus, is easily linked to an open service (SaaS) without dedicated network facilities.

The PLC device can output any given character string to the communication unit (e.g., the "communication unit 13") when the text data includes the text communication command, and can output any given character string to the display unit (e.g., the "display unit 15") when the text data includes no text communication command.

(2) The PLC device of aspect (1) (e.g., the "PLC device 10") may further include a received data processing unit (e.g., the "received data processing unit 14") that outputs reply data that the communication unit (e.g., the "communication unit 13") has received from the network server (e.g., the "network server 40") to the display unit (e.g., the "display unit 15").

This configuration allows the reply data returned from the network server (e.g., the "network server 40") to be displayed on a display device (e.g., the "display device 50").

(3) In the PLC device of aspect (2) (e.g., the "PLC device 10"), the received data processing unit (e.g., the "received data processing unit 14") may store the reply data in the storage device (e.g., the "storage device 20"), and the display unit may output the reply data stored in the storage device (e.g., the "storage device 20") to the display device (e.g., the "display device 50").

This configuration allows the reply data returned from the network server (e.g., the "network server 40") to be temporarily stored in the storage device (e.g., the "storage device 20"), and then displayed on the display device (e.g., the "display device 50").

(4) In the PLC device of aspect (3) (e.g., the "PLC device 10"), the ladder program is implemented to regularly check whether update data of the ladder program is distributed based on the reply data, and the display unit (e.g., the "display unit 15") may show a message prompting an update on the display device (e.g., the "display device 50") when the update data is distributed.

This configuration allows a user of the PLC device (e.g., the "PLC device 10") to check whether the update data of the ladder program that runs on the PLC device (e.g., the "PLC device 10") is distributed.

(5) An industrial machine system of the present embodiment (e.g., the "industrial machine system 2") includes: an industrial machine (e.g., the "machine tool 60") equipped with the PLC device (e.g., the "PLC device 10") of any one of aspects (1) to (4); and an HTTP server. The PLC device (e.g., the "PLC device 10") outputs the text data to the HTTP server when the industrial machine (e.g., the "machine tool 60") gives an alarm.

This configuration can inform a person in charge of solving problems or a manager of the industrial machine (e.g., the "machine tool 60"), who are remote from the industrial machine (e.g., the "machine tool 60"), that the alarm was given.

Embodiments of the present invention have just been described above, but the present invention is not limited to those exemplary embodiments. The advantages described in the present embodiment are merely listed as the most suitable advantages derived from the present invention, and do not limit the advantages of the present invention.

A control method using the PLC device 10 is achieved by software. When the software is used, programs constituting the software are installed in a computer (the PLC device 10). The programs may be distributed to the user in the form of a removable medium, or may be downloaded to the computer of the user via the network. Alternatively, the programs may not be downloaded, but may be provided to the computer (the PLC device 10) of the user as a Web service via the network.

EXPLANATION OF REFERENCE NUMERALS

1 PLC system
10 PLC device
11 PLC program execution unit
12 Text data output unit
13 Communication unit
14 Received data processing unit
15 Display unit
20 Storage device
30 I/O device
35 Network
40 Network server
50 Display device
121 Text data determination unit
122 Output switching unit

The invention claimed is:

1. A programmable logic controller (PLC) device, comprising:
   a controller configured to execute separate programs stored in a storage device to perform the following functions:
   text data output functionality, including:
      reading text data from a storage device; outputting a character string included in an analyzed ladder program;
      determining, based on the content of the text data:
         that the text data includes a message data display command if the text data does not include a predetermined keyword; and
         that the text data includes a text communication command if the text data includes the predetermined keyword; and
      switching the output destination of the text data based on the determination:
         outputting the text data to a display device if the text data does not include the predetermined keyword; and
         outputting the text data to a communication interface if the text data includes the predetermined keyword;
   a display device configured to present character strings output by the controller; and
   a communication interface configured to transmit text data to a network server using a predetermined command.

2. The PLC device of claim 1, wherein the controller is further configured to execute a program stored in the storage device to perform outputting reply data that the communication interface has received from the network server to the display device.

3. The PLC device of claim 2, wherein the controller is further configured to store the reply data in the storage device, and
   the controller is further configured to output the reply data stored in the storage device to the display device.

4. The PLC device of claim 3, wherein the ladder program is implemented to regularly check whether update data of the ladder program is distributed based on the reply data, and
   the controller is further configured to show a message prompting an update on the display device when the update data is distributed.

5. An industrial machine system, comprising: an industrial machine equipped with the PLC device of claim 1; and an HTTP server, wherein
   the PLC device outputs the text data to the HTTP server when the industrial machine gives an alarm.

* * * * *